United States Patent
Pandey et al.

(10) Patent No.: US 9,800,482 B2
(45) Date of Patent: Oct. 24, 2017

(54) SIGNATURE-BASED LATENCY EXTRACTION SYSTEMS AND RELATED METHODS FOR NETWORK PACKET COMMUNICATIONS

(71) Applicant: IXIA, Calabasas, CA (US)

(72) Inventors: Shardendu Pandey, Cedar Park, TX (US); Scott Register, Austin, TX (US)

(73) Assignee: IXIA, Calabasas, CA (US)

( * ) Notice: Subject to any disclaimer, the term of this patent is extended or adjusted under 35 U.S.C. 154(b) by 196 days.

(21) Appl. No.: 14/699,056

(22) Filed: Apr. 29, 2015

(65) Prior Publication Data

US 2016/0323166 A1 Nov. 3, 2016

(51) Int. Cl.
H04L 12/26 (2006.01)

(52) U.S. Cl.
CPC ............ H04L 43/087 (2013.01); *H04L 43/04* (2013.01); *H04L 43/12* (2013.01)

(58) Field of Classification Search
CPC ........ H04L 43/087; H04L 43/04; H04L 43/12
See application file for complete search history.

(56) References Cited

U.S. PATENT DOCUMENTS

| | | | |
|---|---|---|---|
| 6,601,098 B1 | 7/2003 | Case et al. | |
| 6,922,417 B2 | 7/2005 | Vanlint | |
| 7,873,025 B2 | 1/2011 | Patel et al. | |
| 8,228,923 B1 | 7/2012 | Jain et al. | |
| 8,462,781 B2 | 6/2013 | McGhee et al. | |
| 2002/0055998 A1 | 5/2002 | Riddle et al. | |
| 2002/0093917 A1 | 7/2002 | Knobbe et al. | |
| 2003/0046388 A1 | 3/2003 | Milliken | |
| 2005/0089016 A1 | 4/2005 | Zhang et al. | |
| 2005/0207437 A1 | 9/2005 | Spitzer | |
| 2005/0271071 A1 | 12/2005 | Madhavapedddi et al. | |

(Continued)

OTHER PUBLICATIONS

Lee et al., "Maple: A Scalable Architecture For Maintaining Packet Latency Measurements", IMC, Nov. 2012, 14 pgs.

(Continued)

*Primary Examiner* — Chi H Pham
*Assistant Examiner* — Weibin Huang
(74) *Attorney, Agent, or Firm* — Egan Peterman Enders Huston

(57) ABSTRACT

Signature-based latency extraction systems and related methods are disclosed for network packet communications. Disclosed embodiments generate packet signatures (e.g., hash values) for packets received with respect to points within a network packet communication system. For each received packet, its packet signature is compared to packet signatures stored for previously received packets. If no match is found, the packet signature and a timestamp associated with the newly received packet are stored within one or more packet data tables. If a match is found, then the difference between the timestamp associated with the newly received packet and a timestamp stored with the matching packet signature are used to determine a latency value. The latency values can then be used to determine a variety of latency-related parameters for the network infrastructure being measured, and classification information can also be used to generate latency-related histograms. A variety of embodiments can be implemented.

30 Claims, 8 Drawing Sheets

(56) References Cited

U.S. PATENT DOCUMENTS

| | | |
|---|---|---|
| 2007/0195797 A1 | 8/2007 | Patel et al. |
| 2012/0230186 A1* | 9/2012 | Lee ..................... H04L 43/028 370/230 |
| 2013/0063441 A1 | 3/2013 | Choy et al. |
| 2014/0068106 A1 | 3/2014 | Turlington et al. |
| 2014/0119231 A1 | 5/2014 | Chan et al. |
| 2014/0348186 A1* | 11/2014 | Ogata ................... H04J 3/0641 370/508 |
| 2015/0215222 A1* | 7/2015 | Johansson ............... H04L 47/32 370/411 |
| 2016/0149788 A1* | 5/2016 | Zhang ................... H04L 43/10 709/224 |

OTHER PUBLICATIONS

Lee et al., "FincComb: Measuring Microscopic Latencies And Losses In The Presence Of Reordering", Purdue e-Pubs, Department of Computer Science, 2010, 20 pgs.

Search Report and Written Opinion, PCT/US2016/024449; dated Jun. 10, 2016, 13 pgs.

\* cited by examiner

SIGNATURE-BASED LATENCY EXTRACTION SYSTEMS AND RELATED METHODS FOR NETWORK PACKET COMMUNICATIONS

TECHNICAL FIELD OF THE INVENTION

This invention relates to network packet communication systems and, more particularly, to latency measurements for network packet communications.

BACKGROUND

Certain network communication systems utilize network packets for network communications. It is often desirable to monitor network traffic associated with these packet-based networks. To meet these monitoring needs, copies of network packets can be forwarded to diagnostic network monitoring tools. Packets are often forwarded using network hubs, test access ports (TAPs), and/or switched port analyzer (SPAN) ports available on network switch systems. For example, certain network switch systems produced by Cisco Systems include SPAN ports to which traffic on the switches is mirrored. Other techniques can also be used to extract copies of network packets being communicated within a network packet communication system.

When packets pass through one or more network devices within network infrastructure, packets will experience delay associated with their communication path. Network latency is a representation of this packet delay. One problem with current packet network communication systems is that latency has increased due to exponential growth in demand for network communication bandwidth as compared to actual bandwidth that is available within the system. It is often desirable, therefore, to measure latency within a network communication system. One technique to measure network latency due to packet delays caused by network infrastructure is to add timestamps to the packets as they traverse various points in network. However, this direct-timestamp method is intrusive and can itself add latency to existing packets streams by increasing the amount of data being communicated. Another technique to measure latency due to packet delay is to send special timing packets (e.g., pings) and to measure delay associated with special timing response packets through timestamps added to the timing packets and the timing response packets. PTP (Precision Time Protocol) and NTP (Network Time Protocol) are communication protocols that use such special timing packets. These timing-packet techniques, however, are also intrusive and can adversely affect network bandwidth because the number of packets being communicated within the network are increased.

SUMMARY OF THE INVENTION

Signature-based latency extraction systems and related methods are disclosed for network packet communications. The disclosed embodiments generate packet signatures (e.g., hash values) for packets received with respect to points within a network packet communication system. For each received packet, its packet signature is compared to packet signatures stored for previously received packets. If no match is found, the packet signature and a timestamp associated with the newly received packet are stored within one or more packet data tables. If a match is found, then the difference between the timestamp associated with the newly received packet and a timestamp stored with the matching packet signature are used to determine a latency value associated with the newly received packet. The resulting latency values can be stored within a latency data table. Further, this latency data table can also be serialized such that it provides an ordered sequence of latency values based upon when packets are received by a reference port. Sequence pointers for the latency data table can be generated and used to provide this sequential ordering. Received packets can also be tagged with port identifiers (e.g., port numbers) for input ports that receive packets, and these port identifiers can be stored and used during signature matching for received packets. The latency values can be used to determine latency-related parameters for the network infrastructure being measured, such as average latency, minimum latency, maximum latency, packet delay variation or jitter, and/or other latency-related parameters. Classification information can also be generated for the received packets, and this classification information can be used to generate and update latency-related histograms for the received packets based upon common classifications. The received packets can also represent request/response packet pairs associated with one or more applications operating within the network packet communication system, and the resulting latency values can represent network/application level delay. Other variations can also be implemented, and related systems and methods can be utilized, as well.

For one embodiment, a method to measure network packet latency is disclosed including receiving packets at a first input port associated with a first point within a network packet communication system, receiving packets at a second input port associated with a second point within the network packet communication system, and for each received packet the method includes generating a packet signature or the packet, comparing the packet signature to packet signatures stored in a signature table, storing the packet signature within the signature table along with a timestamp associated with the received packet if a signature match is not found, and determining a latency value for the received packet based upon a timestamp associated with the received packet and a timestamp associated with the matching packet signature within the signature table if a signature match is found.

In additional embodiments, the method includes generating hash values as the packet signatures for the received packets, the hash values being based upon selected portions of the received packets. In further embodiments, the packets received at the input ports include timestamps. In still further embodiments, the method includes generating a timestamp for each packet when the packet is received at the first input port or the second input port. In other embodiments, the received packets include request packets and response packets associated with the request packets, and matching packet signatures are configured to pair a response packet to its associated request packet.

In further embodiments, the method includes storing the latency values in a latency table and using the stored latency values to determine one or more latency related parameters for the network packet communication system. In sill further embodiments, the method includes selecting one of the input ports as a reference port, generating sequence pointers for the latency table based upon an order in which packets are received at the reference port, and using the sequence pointers to order the latency values stored in the latency table. In addition, the method can include using the ordered latency values within the latency table to determine one or more latency related parameters for the network packet communication system. Still further, the one or more latency related parameters can include packet delay variation.

In still further embodiments, the method includes storing a port identifier associated with the received packet along with the hash value and the timestamp if a signature match is not found, and a latency value is determined if a signature match is found only if a port identifier associated with the received packet does not match a port identifier stored for the matching packet within the signature table.

In additional embodiments, the method includes storing the packet signature for each received packet within an aging buffer, and after a detection time window, removing the packet signature from the aging buffer. In further embodiments, the method includes comparing each removed packet signature to packet signatures within the signature table and removing any matching packet signature and related timestamp from the signature table. In still further embodiments, the method includes relying upon a size of the aging buffer to determine when packet signatures are removed from the aging buffer. In additional embodiments, the method includes storing the timestamp associated with each packet signature in the aging buffer, and using the timestamp associated with each packet signature to determine when each packet signature is removed from the aging buffer.

In further embodiments, the method includes classifying each packet based upon contents of the packet to generate a packet classification, and using the packet classification to update histogram information about packets having a common packet classification. Still further, the histogram information can include latency information based upon the latency values.

For another embodiment, a system to measure latency for network packets is disclose including a first input port configured to receive packets associated with a first point within a network packet communication system, a second input port configured to receive packets associated with a second point within the network packet communication system, one or more packet signature generators configured to generate a packet signature for each received packet, a signature table configured to store packet signatures and timestamps, and a latency processor configured to compare the packet signature for each received packet to packet signatures stored in the signature table, to store the packet signature within the signature table along with a timestamp associated with the received packet if a signature match is not found, and to determine a latency value for the received packet based upon a timestamp associated with the received packet and a timestamp associated with the matching packet signature within the signature table if a signature match is found.

In additional embodiments, the one or more packet signature generators include one or more hash generators configured to generate hash values as the packet signatures for the received packets, the hash values being based upon selected portions of the received packets. In further embodiments, the latency processor is configured to obtain timestamps from the packets received at the input ports. In still further embodiments, the system includes one or more timestamp generators configured to generate a timestamp for each packet received at the first input port or the second input port. In other embodiments, the received packets include request packets and response packets associated with the request packets, and matching packet signatures are configured to pair a response packet to its associated request packet.

In further embodiments, the latency processor is further configured to store the latency values in a latency table and to determine one or more latency related parameters for the network packet communication system based upon the stored latency values. In still further embodiments, one of the input ports is a reference port, and the latency processor is further configured to generate sequence pointers based upon an order in which packets are received at the reference port and to use the sequence pointers to order the latency values stored in the latency table. In addition, the latency processor can be further configured to use the ordered latency values within the latency table to determine one or more latency related parameters for the network packet communication system. Still further, the one or more latency related parameters can include packet delay variation.

In still further embodiments, the latency processor is further configured to store a port identifier associated with the received packet along with the hash value and the timestamp if a signature match is not found, and the latency processor is further configured to determine a latency value if a signature match is found only if a port identifier associated with the received packet does not match a port identifier stored for the matching packet within the signature table.

In additional embodiments, the system includes an aging buffer, and the latency processor is further configured to store the packet signature for each received packet within the aging buffer and to remove the packet signature from the aging buffer after a detection time window. In further embodiments, the latency processor is further configured to compare each removed packet signature to packet signatures within the signature table and to remove any matching packet signature and related timestamp from the signature table. In still further embodiments, a size of the aging buffer is configured to determine when packet signatures are removed from the aging buffer. In additional embodiments, the latency processor is further configured to store the timestamp associated with each packet signature in the aging buffer and to use the timestamp associated with each packet signature to determine when each packet signature is removed from the aging buffer.

In further embodiments, the system includes a classification engine configured to generate a packet classification for each packet based upon contents of the packet and to use the packet classification to update histogram information about packets having a common packet classification. Still further, the histogram information can include latency information based upon the latency values.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
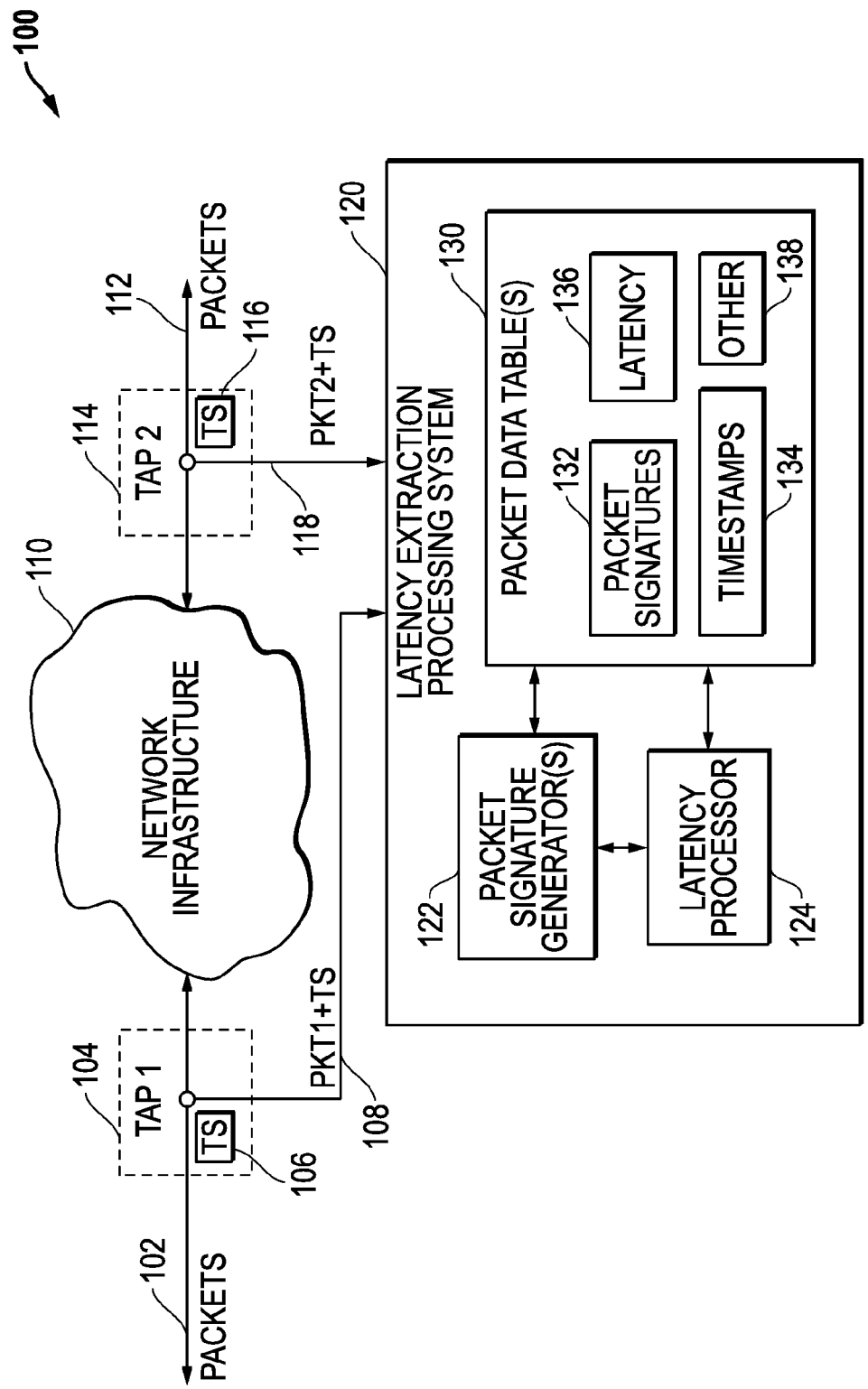
FIG. 1 is a block diagram of an example embodiment for a network packet communications environment including a signature-based latency extraction processing system.

Signature-based latency extraction systems and related methods are disclosed for network packet communications. The disclosed embodiments generate packet signatures (e.g., hash values) for packets received with respect to points within a network packet communication system. For each received packet, its packet signature is compared to packet signatures stored for previously received packets. If no match is found, the packet signature and a timestamp associated with the newly received packet are stored within one or more packet data tables. If a match is found, then the difference between the timestamp associated with the newly received packet and a timestamp stored with the matching packet signature are used to determine a latency value associated with the newly received packet. The resulting latency values can be stored within a latency data table. Further, this latency data table can also be serialized such that it provides an ordered sequence of latency values based upon when packets are received by a reference port. Sequence pointers for the latency data table can be generated and used to provide this sequential ordering. Received packets can also be tagged with port identifiers (e.g., port numbers) for input ports that receive packets, and these port identifiers can be stored and used during signature matching for received packets. The latency values can be used to determine latency-related parameters for the network infrastructure being measured, such as average latency, minimum latency, maximum latency, packet delay variation or jitter, and/or other latency-related parameters. Classification information can also be generated for the received packets, and this classification information can be used to generate and update latency-related histograms for the received packets based upon common classifications. The received packets can also represent request/response packet pairs associated with one or more applications operating within the network packet communication system, and the resulting latency values can represent network/application level delay. Other variations can also be implemented, as desired, and related systems and methods can be utilized, as well.

In operation, the disclosed embodiments provide non-intrusive techniques that measure network latency for packets traveling through network infrastructure by identifying matching packets through packet signatures (e.g., packet hash values) generated for packets received with respect to points within the network packet communication system. Once two matching packets are identified, latency is determined by comparing a first timestamp generated for the packet received at a first point within the network to a second timestamp generated for the packet received at a second point within the network. The timestamps can be generated, for example, using one or more high precision timestamp generators. The packet signatures and timestamps are stored in a packet signature table, and classification and other desired packet related data can also be stored within one or more additional packet data tables. For each received packet, a latency processor determines if the packet signature already exists in the packet signature table. If a match for the packet signature is not found, the packet signature is stored within packet signature table along with the timestamp. If a match for the packet signature is found, latency is determined by comparing the timestamp for the received packet with the timestamp stored in the packet signature table for the matching packet. The packet signature and timestamps for received packets can also be stored within an aging buffer (e.g., first-in-first-out (FIFO) buffer). This aging buffer can be sized, for example, such that it stores the packet signatures for a duration that exceeds the maximum expected latency for the network infrastructure being measured. Further, timestamps can also be stored within the aging buffer and used to cause data within the aging before to be aged out and removed from the aging buffer. Packet signatures and timestamp data can also be removed from the packet signature table when a packet signature ages out of the aging buffer if a matching packet signature still exists within the packet signature table. The resulting latency values for matching packets and other packet related information, such as packet classification information, are stored in one or more latency, classification, and/or other data tables, and this latency and related packet information can be used for additional processing, as desired. In further embodiments, the packet extraction processing system can be implemented as one or more virtual machines operating within virtual environments hosted by one or more processing devices. A wide variety of variations can also be implemented while still taking advantage of the signature-based latency extraction techniques described herein.

FIG. 1 is a block diagram of an example embodiment 100 for a network packet communication system environment. Packets 102 and packets 112 associated with one or more packet flows are communicated through network infrastructure 110. As described herein, the latency extraction processing system 120 determines network latency and related information associated with the network infrastructure 110 by performing signature-based analysis of packets 102 and packets 112. For the embodiment depicted, a first network TAP (test access port) 104 receives packets 102 and non-intrusively generates copies of these packets. The first TAP 104 can also generate a timestamp associated with receipt of each packet using a timestamp generator 106, although the timestamp generator 106 can also be included within the latency extraction processing system 120 as described herein. The resulting packets (PKT1) and related timestamps (TS) are output as a first packet data stream 108 to the latency extraction processing system 120. Similarly, a second network TAP (test access port) 114 receives packets 112 and non-intrusively generates copies of these packets. The second TAP 114 can also generate a timestamp associated with receipt of each packet using a timestamp generator 116, although the timestamp generator 116 can also be included within the latency extraction processing system 120 as described herein. The resulting packets (PKT2) and related timestamps (TS) are output as a second packet data stream 118 to the latency extraction processing system 120. It is noted that the network infrastructure 110 can be one or more network connected devices that are configured to communicate network packets, and the network infrastructure can also include one or more virtual machines operating within a virtualization layer for a virtual processing system. Further, it is noted that the network packet communications can also include wired, wireless, or wired and wireless network communications. In addition, the network tap points 104/114 can cover a single network hop or multiple network hops such that a variety of latency measurements can be made with respect to a network packet communication system by adjusting the tap points 104/114 and thereby the network infrastructure 110 being measured for latency.

As described in more detail below, the latency extraction processing system 120 receives the first packet data stream 108 and the second packet data stream 118 and generates latency values 136 based upon a comparison of packet signatures 132 generated for packets within these streams 108/118 and timestamps 134 related to these packets. One or more packet signature generators 122 generate the packet signatures 132 associated with packets for these incoming packets from streams 108/118. As one example, one or more hash generators can be used as the packet signature generators 122, and these hash generators can generate hash values as the packet signatures. The latency processor 124, which can include one or more processing devices, stores the packet signatures 132 and timestamps 134 associated with received packets from streams 108/118 within one or more packet data tables 130 until matching packets are found. When the latency processor 124 identifies matching packets within the streams 108/118 based upon comparisons of packet signatures 132, the latency processor 124 then uses differences between related timestamps within timestamps 134 to determine latency values 136 for these matching packets with respect to the network infrastructure 110. The latency extraction processing system 120 can also determine, generate, and store other data 138 associated with the received packets within streams 108/118. This latency data 136 and other data 138 can then be used for further processing and/or analysis of the network communications by the latency extraction processing system 120, or this data 136/138 can be communicated to one or more additional processing systems for further processing and/or analysis, as desired.

Figure 2:
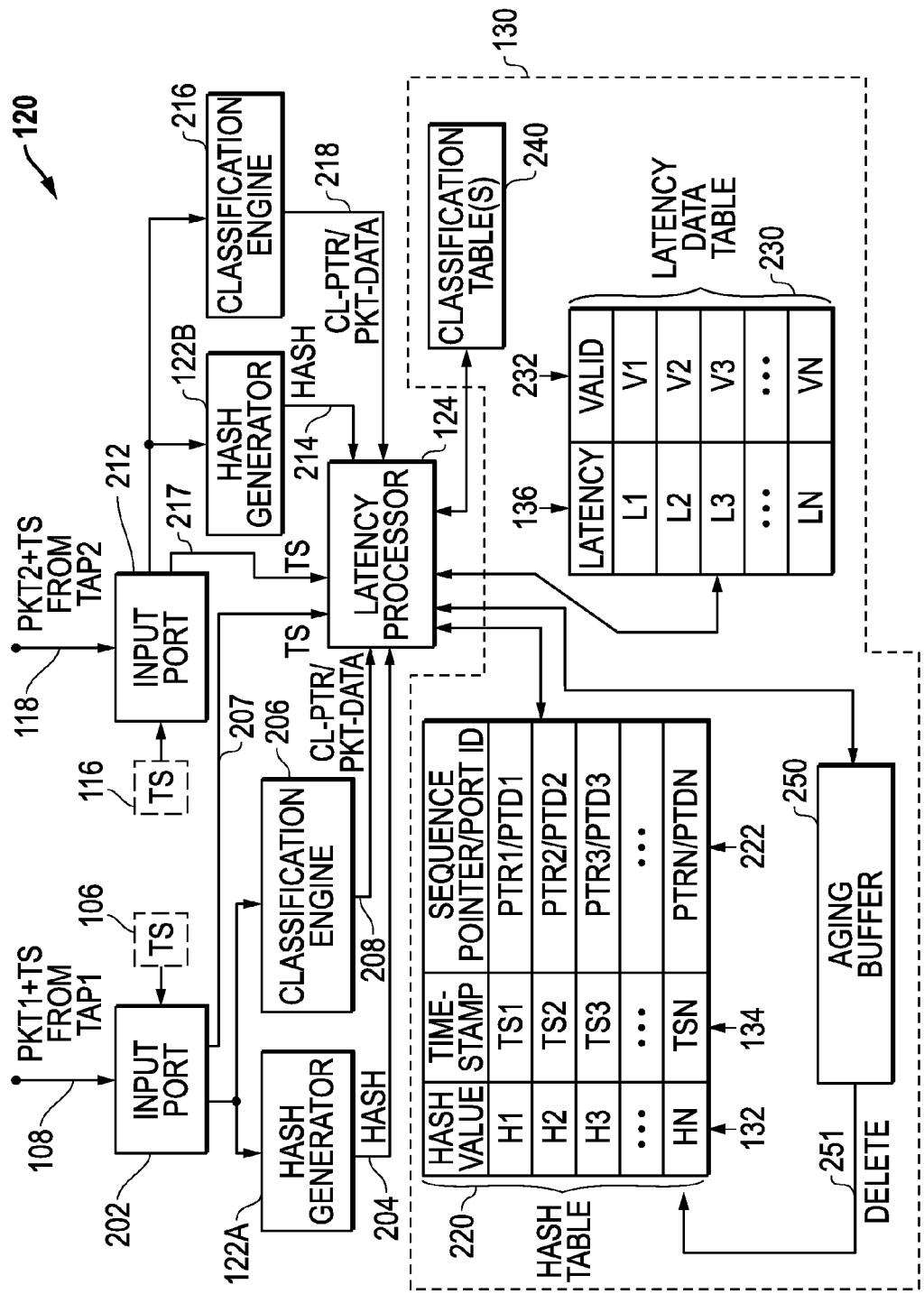
FIG. 2 is a block diagram of an example embodiment for a signature-based latency extraction processing system that receives and processes packets streams to determine latency and latency-related information associated with packets communicated through network infrastructure.

FIG. 2 is a block diagram of an example embodiment for a latency extraction processing system 120 that receives and processes the packets streams 108/118 to measure latency and to collect related information associated with the packets communicated through the network infrastructure 110. For the example embodiment depicted, the latency extraction processing system 120 includes input ports 202/212, hash generators 122A/122B, classification engines 206/216, a latency processor 124, and packet data tables 130 that include a hash table 220, a latency data table 230, and classification tables 240. As indicated above, the timestamp generators 106 and 116 can be included within the latency extraction processing system 120, if desired, instead of relying upon timestamp generators in the first and second TAPS 104/114 to generate timestamps for the received packets. It is also noted that the hash generators 122A/122B are used for this example embodiment to implement the packet signature generator(s) 122 shown in FIG. 1. Although the hash generators 122A/122B are depicted as two separate hash generators, the hash generators 122A/122B can also be implemented as a single hash generator that generates hash values for both packet streams 108/118. Further, although the classification engines 206/216 are depicted as two separate classification engines, the classification engines 206/216 can also be implemented as a single classification engine that generates classification data for both packet streams 108/118. Similarly, although the timestamp generators 106/116 are depicted as two separate timestamp generators, the timestamp generators 106/116 can also be implemented as a single timestamp generator that generates timestamps for both packet streams 108/118. Further, although the latency processor 124 is depicted as a single processor, the latency processor 124 can also be implemented using multiple processing devices, if desired. Other variations could also be implemented.

The first packet data stream 108 and its related timestamps are received by input port 202. As shown in FIG. 1, the first packet stream 108 can include first packets (PKT1) and related timestamps (TS) from the first TAP 104, although other techniques and devices could also be used to provide the first packet stream and related timestamps. A hash generator 122A is coupled to the input port 202 and generates hash values 204 for the packets within the first packet data stream 108. A classification engine 206 is also coupled to the input port 202 and generates classification information and other packet related data associated with the packets within the first data stream 108. For example, the classification engine 206 can be configured to use data from one or more fields within each packet to generate a classification pointer (CL-PTR) for the packet that classifies the packet. Each packet can be classified, for example, by the data type of packet (e.g., audio, video, and/or other data type), by the session or flow associated with the packet (e.g., voice call, email, web services, and/or other session/flow types), and/or by other packet related information. The classification engine 206 then outputs packet data 208, such as a classification pointer (CL-PTR) and/or other packet data (PKT DATA), to the latency processor 124. The hash value 204 and the timestamp (TS) 207 for each packet are also received by the latency processor 124.

The second packet data stream 118 and its related timestamps are received by input port 212. As shown in FIG. 1, the second packet stream 118 can include second packets (PKT2) and related timestamps (TS) from the second TAP 114, although other techniques and devices could also be used to provide the second packet stream and related timestamps. A hash generator 122B is coupled to the input port 212 and generates hash values 214 for the packets within the second packet data stream 118. A classification engine 216 is also coupled to the input port 212 and generates classification information and other packet related data associated with the packets within the second data stream 118. For example, the classification engine 216 can be configured to use data from one or more fields within each packet to generate a classification pointer (CL-PTR) for the packet that classifies the packet. Each packet can be classified, for example, by the data type of packet (e.g., audio, video, and/or other data type), by the session or flow associated with the packet (e.g., voice call, email, web services, and/or other session/flow types), and/or by other packet related information. The classification engine 216 then outputs packet data 218, such as a classification pointer (CL-PTR) and/or other packet data (PKT DATA), to the latency processor 124. The hash value 214 and the timestamp (TS) 217 for each packet are also received by the latency processor 124.

The latency processor 124 compares the packet signatures, which are hash values 204/214 for the embodiment of FIG. 2, to previously stored packet signatures and determines latency for matching packet signatures based upon differences between respective timestamps associated with the matching packet signatures. As described in more detail below, the latency processor 124 stores hash values 132, timestamps 134, and sequence pointers 222 in a hash table 220 as packets are received within the packet streams 108/118. In particular, latency processor 124 stores hash values 132 as represented by the hash values (H1, H2, H3 . . . HN) in data records within the hash table 220. The timestamps 134 associated with these packets are also stored along with the hash values 132 as represented the timestamps (TS1, TS2, TS3 . . . TSN) in hash table 220. Sequence pointers (PTR1, PTR2, PTR3 PTRN) 222 are also generated and stored in hash table 220 for each stored hash value 132 and timestamp 134 packet. The sequence pointers 222 are used to point to and reference latency records within the latency data table 230. When latency values (L1, L2, L3, . . . LN) 136 are determined for matching packets based upon differences in timestamp values, the latency values 136 are stored within a latency record based upon the sequence pointers 222. As described further below, the valid bits (V1, V2, V3 . . . VN) 232 for the latency records are initially set to "invalid" states (e.g., logic 0) and are subsequently changed to "valid" states (e.g., logic 1) when valid latency values are determined after matching packet hashes are found.

In operation, the latency processor 124 compares hash values for newly received packets within packet streams 108/118 to hash values stored in the hash table 220 for previously received packets to identify matching packets. If the hash values match, the latency processor 124 treats the newly received packet as a match to the previously received packet and determines latency associated with the matching packets based upon the difference between the timestamps associated with the matching packet hash values. In particular, if a match is found, the latency processor 124 compares the timestamp for the newly received packet with the timestamp stored within the reference data table 220 for the matching packet. The difference value represents the latency for the packet as it traveled through the network infrastructure 110, and this difference value is stored as the latency value 136 within the record of the latency data table 230 pointed to by the sequence pointer 222 for the matching packet hash value within hash table 220. For example, if the hash 204/214 for a newly received packet matches the third hash value P3 in table 220, the associated timestamp TS3 is compared to the timestamp for this newly received packet. The difference value between these two timestamps is then stored as the latency value 136 in the record within the latency data table 230 pointed to by the sequence pointer PTR3. Assuming the associated record is the second record including L2/V2, the latency value is written as value L2 into the latency data table 230 when the match is found, and the associated valid bit V2 is also set to its "valid" state. Once this match has been found and the latency data has been stored within latency data table 230, the data for the matching packet within reference data table 220 can be removed.

It is noted that additional and/or different data can also be stored within the hash table 220 along with the hash values 132 and the timestamps 134. For example, for the embodiment described above and with respect to FIG. 3A below, sequence pointers (PTR1, PTR2, PTR3 . . . PTRN) are stored as data 222. However, for the embodiment described with respect to FIG. 3B below, port identifiers (PID1, PID2, PD3 . . . PIDN) are stored as data 222 instead of the sequence pointers (PTR1, PTR2, PTR3 . . . PTRN) 222. Further, port identifiers and sequence pointers can both be stored with the hash table 220, and other packet related data can also be stored in the hash table 220, if desired, while still taking advantage of the signature-based latency extraction techniques described herein.

It is noted that the latency values 136 stored within the latency data table 230 can be used to generate a variety of latency related information for the packets traveling through the network infrastructure 110. For example, the latency values 136 can be used to determine minimum latency, maximum latency, average latency, latency variation (often called jitter), and/or other latency related parameters for packets traveling through the network infrastructure 110. In part, latency refers to a measure of delay between when a packet or a packet pair (e.g., request/response packets) appears in time at two different points in a network communication system, such as the difference in time between when a packet appears at the first TAP 104 and the second TAP 114 in FIG. 1, or such as the difference in time between when a packet appears at the input port 202 and at the input port 212 in FIG. 2. Other packet related parameters could also be generated, if desired, using the latency values 136 stored in latency data table 230 in combination with other packet related data. It is also noted that he sequence pointers 222 can be generated as serial tokens from the latency data table 230. As packets are processed, one of the input ports 202/212 can be used as a reference port such that when new packets are received at the that port, the next sequential location within the latency data table 230 is used as the sequence pointer (PTR) for the data stored in hash table 220 for that packet. It is further noted that the timestamps generated by the timestamp generators 106/116 are configured to provide an accurate time representation of when a given packet is seen at a given point in network communication system, such as when received by the TAPS 104/114 or by the input ports 202/212. The timestamp generators 106/116 can also be configured to lock to an accurate time source, such as a GPS (Global Positioning System) clock and/or to a network master clock source, such as one made available through PTP (Precision Time Protocol) or NTP (Network Time Protocol) communications. Other variation can also be implemented.

The latency processor 124 can also use an aging buffer 250 to store packet data for a selected amount of time within a detection time window. For example, the latency processor 124 can store the hash values (H1, H2, H3 . . . HN) for the received packets within streams 108/118 within aging buffer 250 (e.g., a first-in-first-out (FIFO) buffer). After the detection time window has passed for packet data within the aging buffer 250, this packet data can be removed. The detection time window can be determined, for example, through the size of the aging buffer 250. For example, the aging buffer 250 can be sized such that it stores the packet hashes for a duration that exceeds the maximum expected latency for the network infrastructure being measured (e.g., 50-100 milliseconds, although other durations could also be used). Further, timestamps (T1, T2, T3 . . . TN) can also be stored within the aging buffer 250 and can be used by the latency processor 124 to determine when a detection time window has passed for packet data such that this aged-out data should be removed. As represented by delete arrow 251, the latency processor 124 can also cause matching hash values and related timestamps to be removed from the hash table 220 when packet data ages out of the aging buffer 250 if a matching hash value still exists within the hash table 220, for example, after the packet data has been stored with the aging buffer for a predetermined threshold amount of time (e.g., 50-100 milliseconds, although other thresholds could also be used).

The latency processor 124 can also use one or more classification data table(s) 240 to store additional information concerning received packets and matched packets. For example, packet counts for received packets having a particular classification can be stored in classification tables 240 along with packet byte counts for packets contents and/or other packet related data and statistics. As a further example, the classification pointers (CL-PTRs) generated by the classification engines 206/216 can be used to generate latency histograms with respect to packets having common classifications. The classification engines 206/216, for example, can extract data from a set of desired fields within each packet and can then apply one or more classification algorithms to this set of data to generate classification data for packet identification purposes. Classification hash algorithms can also be applied to the data to compress the amount of information being processed. As indicated above, the classification pointers can be generated using data from one or more different fields within each packet. For example, a classification pointer (CL-PTR) can be generated for each packet based upon a 5-tuple including source IP (Internet Protocol) address, source port number, destination IP address, destination port number, and network protocol. Other techniques could also be used to generate one or more classification pointers. Other histograms and/or packet parameters can also be generated and stored within the classification tables 240, as desired, with respect packet related data. Other variations could also be implemented while still taking advantage of the signature-based latency extraction techniques described herein.

It is noted that various latency related parameters can be tracked using the latency data table 230, the classification tables 240, and/or other data tables. For example, a maximum (MAX) latency value can be tracked by comparing each new latency value with a previous maximum detected latency value. If the new latency value is greater than the previous maximum latency value, the new latency value is kept as the maximum latency value. If the new latency value is not greater than the previous maximum latency value, the previous maximum latency value is kept as the maximum latency value. Similarly, a minimum (MIN) latency value can be tracked by comparing each new latency value with a previous minimum detected latency value. If the new latency value is less than the previous minimum latency value, the new latency value is kept as the minimum latency value. If the new latency value is not less than the previous minimum latency value, the previous minimum latency value is kept as the minimum latency value. Further, rather than keeping the maximum (MAX) and minimum (MIN) values as each new latency value is detected, the maximum/minimum latency values can also be determined by analyzing the latency values stored within the latency data table 230 to determine maximum and/or minimum values within the latency data table 230. In addition, an average latency value can also be tracked by dividing the sum of all detected latency values by the number of latency values detected. As with the maximum/minimum determinations, the average latency value can be kept as each new latency value is determined and/or can be determined by analyzing the latency values stored in the latency data table 230. Other latency related parameters can also be determined, as desired, and classification data stored in the classification tables 240 can also be used for latency related determinations. Other variations can also be implemented while still taking advantage of the signature-based latency extraction techniques described herein.

It is noted that the hash table 220 in the example embodiment of FIG. 2 is implemented as a single hash table. However, hash table 220 could also be implemented as two or more different hash tables. For example, a hash table could be associated with each input port 202/212. For such an embodiment, when a packet is received at one port, the latency processor 124 is configured to perform a look up within the hash table associated with the other port. The packet data (e.g., hash and timestamp) can then be stored within the port's hash table if the look up operation does not find a matching packet hash value in the other hash table. Further, the latency processor 124 can be also be distributed such that its functions are split among multiple different latency processors. Further, the timestamp generators 106/116, the hash generators 122A/122B, the classification engines 206/216, and/or the latency processor 124 can be distributed geographically such that one or more of the functions described for these components are performed at different geographic locations. This geographic distribution can be implemented, for example, to improve accuracy of measurements such as by locating the timestamp generators 106/116 at the same geographic location as the TAPs 104/114 that generate the copy of the packets being measured.

As indicated above, the TAPs 104/114 can also be implemented as other devices or components that are configured to generate copies of packet traffic within a network packet communication path. For example, switched port analyzer (SPAN) ports on network switches can be used to generate copies of packets being communicated through a network switch. The TAPs 104/114 or other packet extraction devices or components can also be located at the same geographic location as the latency extraction processing system 120 or can be remotely located depending upon the network infrastructure 110 being measured. Further, one or more packet tunnel protocols can be also be used to forward packets from the TAPs 104/114 or other packet extraction devices or components to the latency extraction processing system 120. Further, tags can be added to extracted packets that can be used to identify and classify the packets during later processing. For example, rather than simply determine an average latency for all packets received and matched, latency calculations can be based upon one or more classification parameters associated with the packets and/or tags associated with the packets. These parameters can include, for example, source IP address, destination IP address, source port number, destination port number, network protocol, application, and/or other parameter associated with the packet and/or its tag. As one further example, a 5-tuple tag can be used to classify the packet, and this 5-tuple tag can include the source IP address, the destination IP address, the source port, the destination port, and a protocol value. Latency calculations and histograms can then be generated and updated based upon latency values and this classification information.

The hash generators 122A/122B can be configured to generate hash values based upon one or more hash algorithms that are applied to data within each packet. The resulting hash values or keys are used to provide the packet signatures 132, and these hash values or keys effectively reduce the size of the packets (e.g., 128 bytes) to smaller data values (e.g., 32 bits) that can still be used to identify different packets. Any desired hash algorithm could be used. Preferably, a hash algorithm is configured to disregard certain fields, such as a TTL (time-to-live) field, that are likely to change as a packet traverses one or more networking devices. Other fields, such as a source/destination IP (Internet Protocol) addresses, may or may not change depending upon networking device(s) and their capabilities and policies. Further, some packets may have Network Address Translation (NAT) applied, and other packets will not have such NAT applied. By generating hash values based upon selected portions of the packet that are expected to remain unchanged (e.g., source/destination IP addresses, source/destination ports, network protocol), the resulting hash values can remain consistent for packets as they travel through network infrastructure 110 even if other portions of the packet are modified. As such, the disclosed embodiments are able to measure latency for network packets, even if they are modified by network infrastructure 110, by matching packet signatures (e.g., hash values) and by then comparing timestamps associated with matching packet signatures.

The hash generators 122A/122B are also preferably configured to apply hash algorithms having uniform distribution characteristics such that resulting hash values are generated with even distributions across the range of possible hash values. Further, it is desirable that the hash algorithms generate different hash values for data strings that are different but similar so that similar but different data strings can be distinguished. Other considerations can also be used to select the hash algorithms. It is further noted that SHA-1, MD5, FNV (Fowler-Noll-Vo), and MurmurHash are known algorithms for generating hash values based upon selected input parameters. It is further noted that large cryptographic hash algorithms, such as MD5, may be difficult to utilize for the embodiments described herein because they tend to be complex and slow algorithms. It is also noted that PRBS (pseudo-random binary sequence), CRC (cyclic redundancy check), and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms can also be used to provide hash values. If desired, a non-cryptographic MurmurHash-type hash algorithm can be used and can be split into multiple 16-bit hash processes that execute in parallel followed by a final series of mixing steps. The mixing steps can be operated at 200 MHz or above, if desired, to generate resulting hash values, such as 32-bit hash values. Other variations, hash algorithms, and combinations of has algorithms can also be implemented while still taking advantage of the signature-based latency extraction techniques described herein.

It is further noted that the latency processor 124, the timestamp generators 106/116, the hash generators 122A/122B, and/or classification engines 206/216 can be implemented using one or more processing devices including controllers, microcontrollers, microprocessors, hardware accelerators, configurable logic devices (e.g., field programmable gate arrays), and/or other processing devices. Further, the one or more processing devices can be configured to execute instructions stored in a non-transitory tangible computer-readable medium to perform the functions described herein. In addition, one or more packet data table(s) 130 can be implemented as any desired non-transitory tangible computer-readable medium. Such computer readable mediums include, for example, data storage devices, FLASH memory, random access memory, read only memory, programmable memory devices, reprogrammable storage devices, hard drives, floppy disks, DVDs, CD-ROMs, and/or any other non-transitory data storage mediums. As described further below with respect to FIGS. 6A-B below, the latency extraction processing system 120 can also be implemented as one or more virtual machine (VM) platforms operating within a virtual processing environment hosted by one or more host processing systems. It is further noted that the network communications can be based upon any desired protocol or combination of protocols including Ethernet protocols, multi-protocol label switching (MPLS) protocols, Fibre-Channel (FC) protocols and/or any other desired communication protocol that can be used for packet-based network communications. Other implementations could also be used while still taking advantage of the signature-based latency extraction techniques described herein.

Figure 3A:
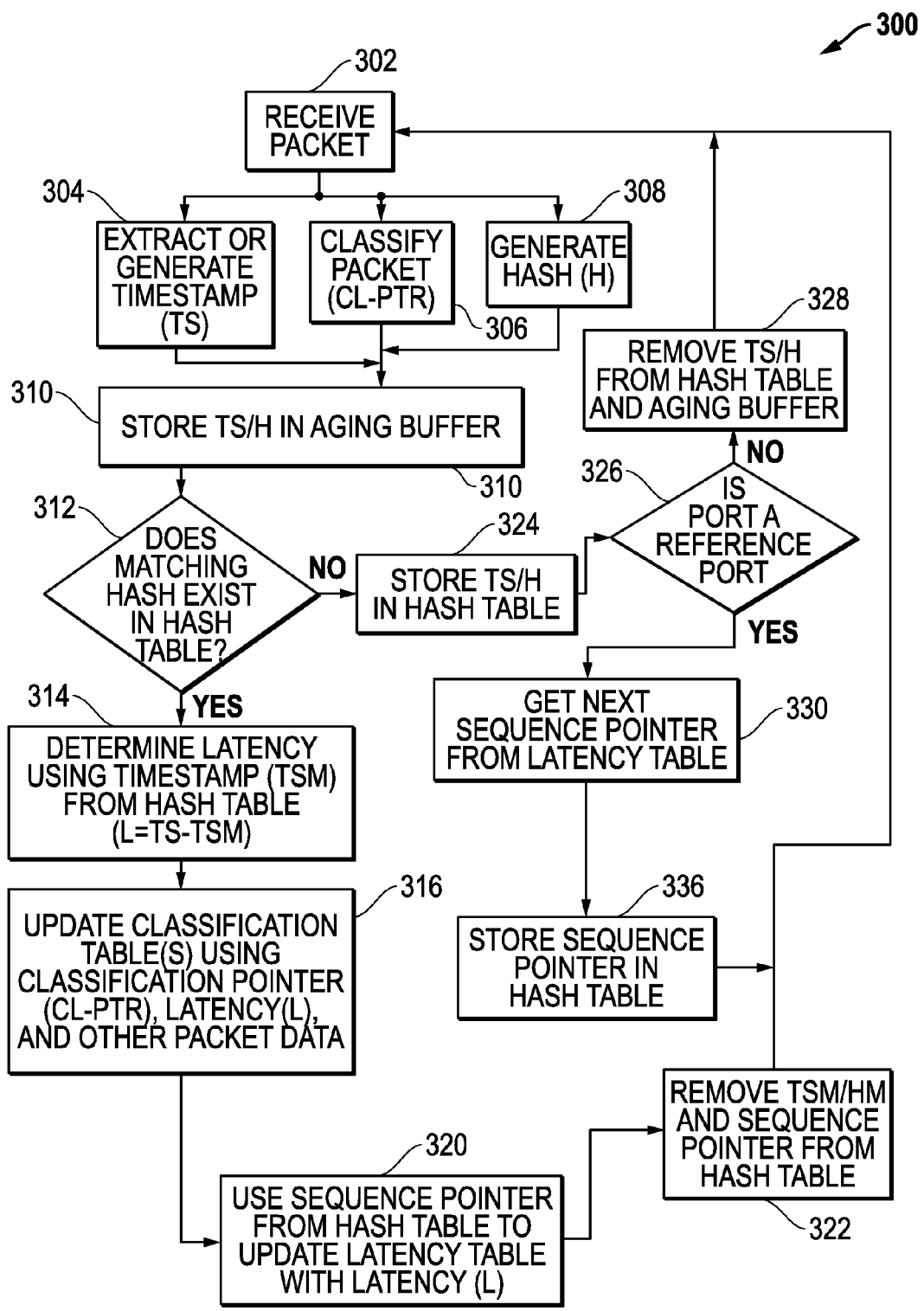
FIG. 3A is a process flow diagram of an example embodiment for operation of the latency extraction processing system of FIG. 2 where sequence pointers are stored in a packet signature table.

FIG. 3A is a process flow diagram of an example embodiment 300 for operation of the latency extraction processing system 120 as described with respect to the example embodiment of FIG. 2 where sequence pointers are stored as data 222 in the hash table 220. For embodiment 300, a packet is first received in block 302. A timestamp (TS) is extracted from the packet data or generated for the packet in block 304. The packet is classified in block 306 to generate a classification pointer (CL-PTR). A hash value (H) is also generated in block 308 for the packet using contents of the packet. Flow then passes to block 310 where the timestamp (TS) and the hash value (H) are stored in the aging buffer 250. A latency value for the received packet can also be set to an "invalid" state until a valid latency has been measured. In block 312, a determination is made whether a matching hash value exists within the hash table 220.

If the determination in block 312 is "NO," then flow passes to block 324 where the timestamp (TS) and hash value (H) are stored in hash table 220. A determination is then made in block 326 whether the receiving port for the packet was designated as a reference port. If "NO," then flow passes to block 328 where the timestamp (TS) and hash value (H) are removed from the hash table 220 and from the aging buffer 250. Flow then passes back to block 302. If the determination in block 326 is "YES," then flow passes to block 330 where the next sequence pointer is obtained from the latency table 230. Flow then passes to block 336 where the sequence pointer 222 is stored in the hash table 220 along with the packet data (TS/H). Flow then passes back to block 302.

If the determination in block 312 is "YES," then flow passes to block 314 where latency is determined using the matching timestamp (TSM) extracted from the hash table for the matching hash value stored within the hash table. The latency value (L) is represented by the difference between timestamp (TS) for the received packet and the matching timestamp (TSM) for the matching packet hash value (e.g., L=TS−TSM). In block 316, classification tables 240 are updated using the classification pointer (CL-PTR), the latency value (L), and other packet data, depending upon the additional classification and other data being collected for the received packets that match previously received packets. Flow then passes to block 320 where the sequence pointer from the hash table 220 is used to locate and update a latency record within the latency table 230 with the latency value (L). The valid bit in the latency table 230 is also then set to a "valid" state. In block 322, the matching timestamp (TSM)

and hash value (HM) for the matching packet data within the hash table 220 are removed from the hash table 220 along with the sequence pointer 222 stored for that packet data within the hash table 220. From block 322, flow passes back to block 302.

It is noted that through the use of the sequence pointers 222, the valid latency values 136 stored within latency table 230 will be in sequential order as received at the port designated as the reference port. With respect to embodiment 300, new sequence pointers are generated for records within the latency table 230 upon receipt of packets at the reference port through the operation of determination block 326. If the packet was not received at the reference port, then block 328 is reached where packet data for that packet is not stored in the hash table 220 or the aging buffer 250. If the packet was received at the input port 202/212 designated as the reference port, then blocks 330 and 336 will be reached where a new sequence pointer for the latency table 230 is obtained and is stored along with the timestamp (TS) and hash value (H) within the hash table 220. When a matching packet is subsequently received at one of the input ports 202/212, a match will be found and block 320 is ultimately reached where the sequence pointer is used to update the latency table 230. As such, the resulting latency values 136 stored in latency table 230 will be in sequential order as packets are received at the input port 202/212 that was designated as the reference port. This sequential ordering is useful in determining certain latency related parameters such as packet delay variation or jitter for received packets. This sequential ordering can also be used for other purposes, as desired. It is noted that either input port 202/212 can be designated as the reference port. Other variations could also be implemented.

Figure 3B:
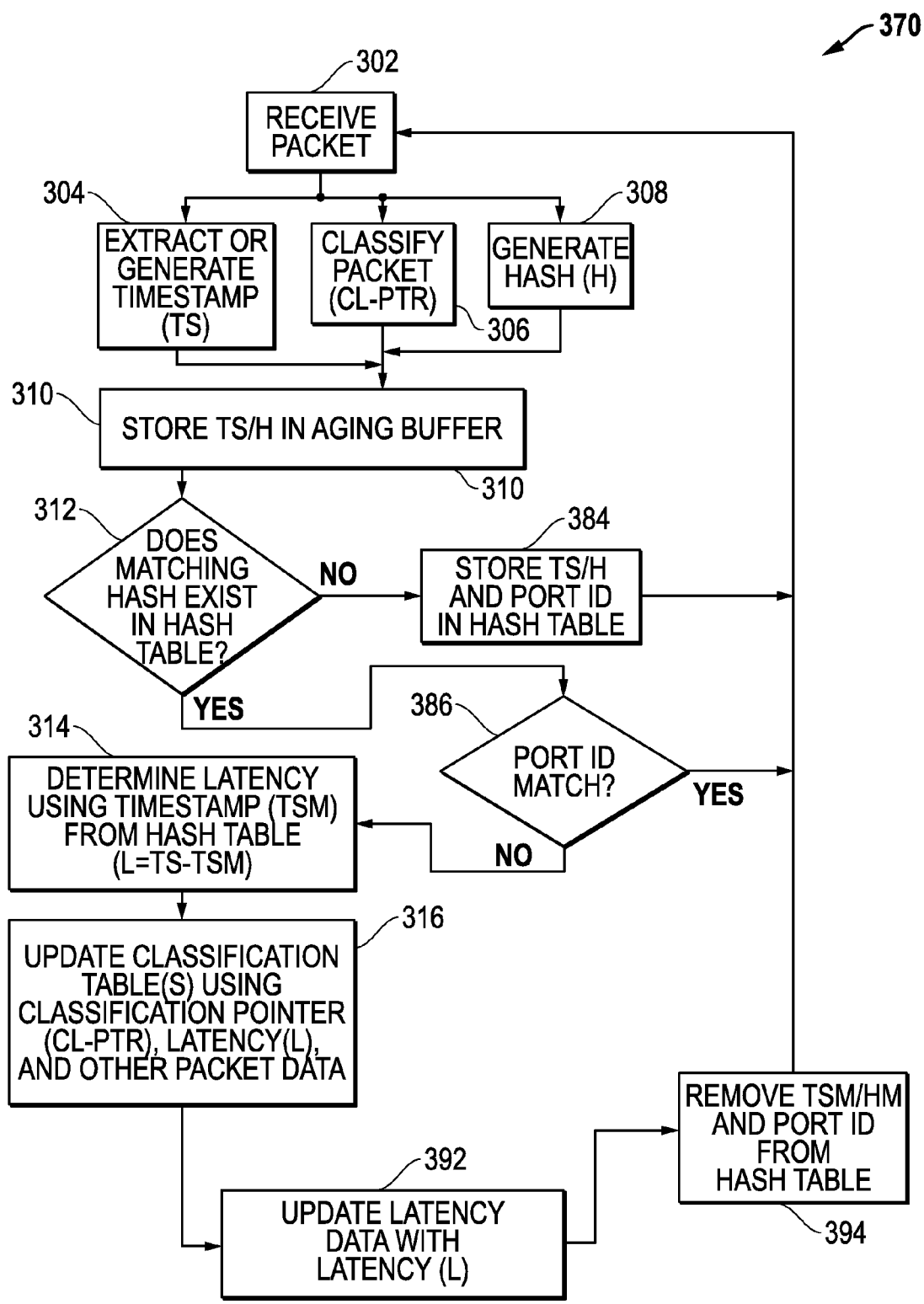
FIG. 3B is a process flow diagram of an example embodiment for operation of the latency extraction processing system of FIG. 2 where port identifiers are stored in a packet signature table.

FIG. 3B is a process flow diagram of an example embodiment 370 for operation of the latency extraction processing system 120 as described with respect to the example embodiment of FIG. 2 where port identifiers (IDs), such as port numbers, are stored as data 222 in the hash table 220. The port IDs (PID1, PID2, PID3 . . . PIDN) represent an indication of which input port 202/212 received the incoming packet. Blocks 302, 304, 306, 308, 310, and 312 are the same as for embodiment 300 of FIG. 3A. However, other blocks are changed as sequence pointers are no longer tracked. Embodiment 370 can be used, for example, where delay variation or jitter is not being tracked and/or for other applications where the sequence of received packets is not being tracked or needed for the latency related information being generated.

Looking back to FIG. 3B, if the determination in block 312 is "NO," then flow passes to block 384 where the timestamp (TS) and hash value (H) are stored in hash table 220 along with the port identifier (ID) for the packet. If the determination in block 312 is "YES," then flow passes to block 386 where a determination is made whether the port ID for the new packet matches the stored port ID. If "YES," then flow passes back to block 302. If "NO," then flow passes to block 314 where latency is determined using the matching timestamp (TSM) extracted from the hash table for the matching hash value stored within the hash table. The latency value (L) is represented by the difference between timestamp (TS) for the received packet and the matching timestamp (TSM) for the matching packet hash value (e.g., L=TS−TSM). In block 316, classification tables 240 are updated using the classification pointer (CL-PTR), the latency value (L), and other packet data, depending upon the additional classification and other data being collected for the received packets that match previously received packets.

Flow then passes to block 392 where the latency data is updated with the latency value (L). For example, where only minimum, maximum, and average latency values are being tracked, these values are updated with the new latency value (L) before it is discarded. The latency value (L) can also be stored in a latency data table 230 for later analysis, if desired. From block 392, flow passes to block 394 where the matching timestamp (TSM) and hash value (HM) for the matching packet data within the hash table 220 are removed from the hash table 220 along with the port ID stored for that packet data within the hash table 220. From block 394, flow passes back to block 302.

Figure 3C:
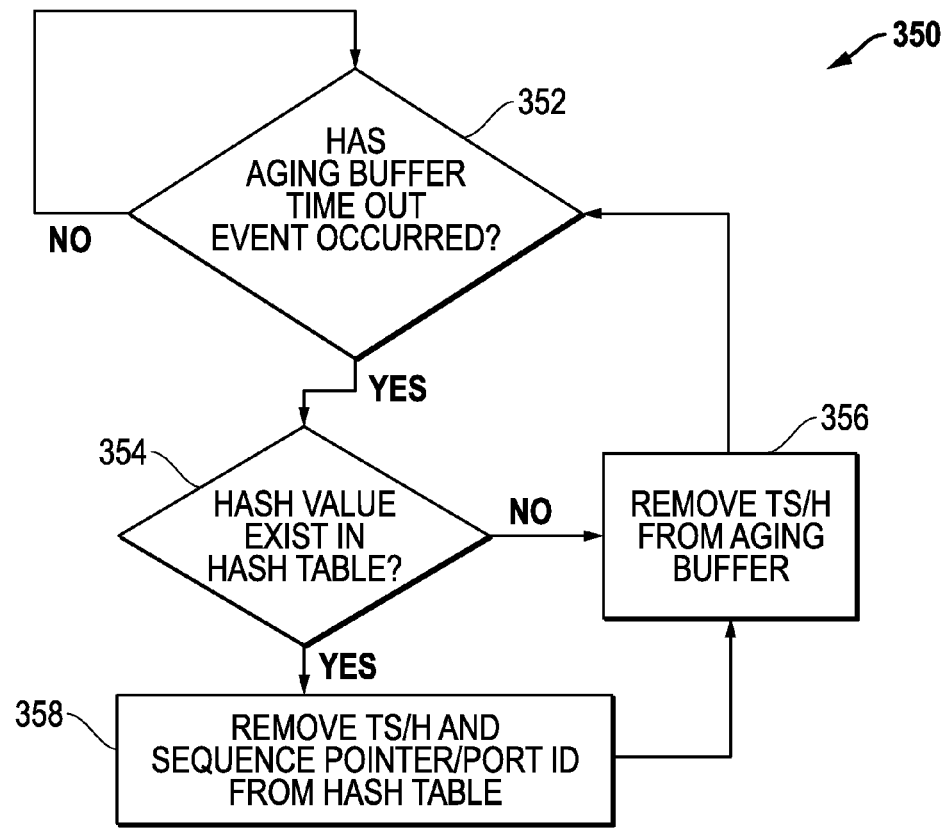
FIG. 3C is a process flow diagram of an example embodiment for operation of the aging buffer within the latency extraction processing system of FIG. 2.

FIG. 3C is a process flow diagram of an example embodiment 350 for operation of the aging buffer 250. In block 352, a determination is made whether a time out event has occurred for a record with the aging buffer 250. For example, this time out event can occur after a detection time window has passed for a particular packet data record within the aging buffer 250. As indicated above, this time out determination that the detection time window has passed can be made by the latency processor 124, for example, by analyzing timestamps stored along with hash values within the aging buffer 205. This time out determination that the detection time window has passed can also be made by sizing the aging buffer 250 such that records will cycle out of the buffer after an amount of time that would exceed an expected maximum time for latency within the network infrastructure 110. Other techniques could also be used to determine when a detection time window has passed.

If the determination in block 352 is "NO," then flow pass back to block 352. When a time out event does occur for a record, the determination in block 352 will be "YES." Flow then passes to block 354 where a determination is made whether the hash value for the packet data stored in the aging buffer 250 matches a hash value for packet data stored within the hash table 220. If "NO," then flow passes to block 406 where the timestamp (TS) and hash value (H) are removed from the aging buffer 250. If "YES," then flow first passes to block 358 where the timestamp (TS) and hash value (H) along with the sequence pointer or port identifier (ID) 222 are removed from the hash table 220. Flow then passes to block 356. From block 356, flow passes back to block 352 until the next time out event is detected.

Figure 4:
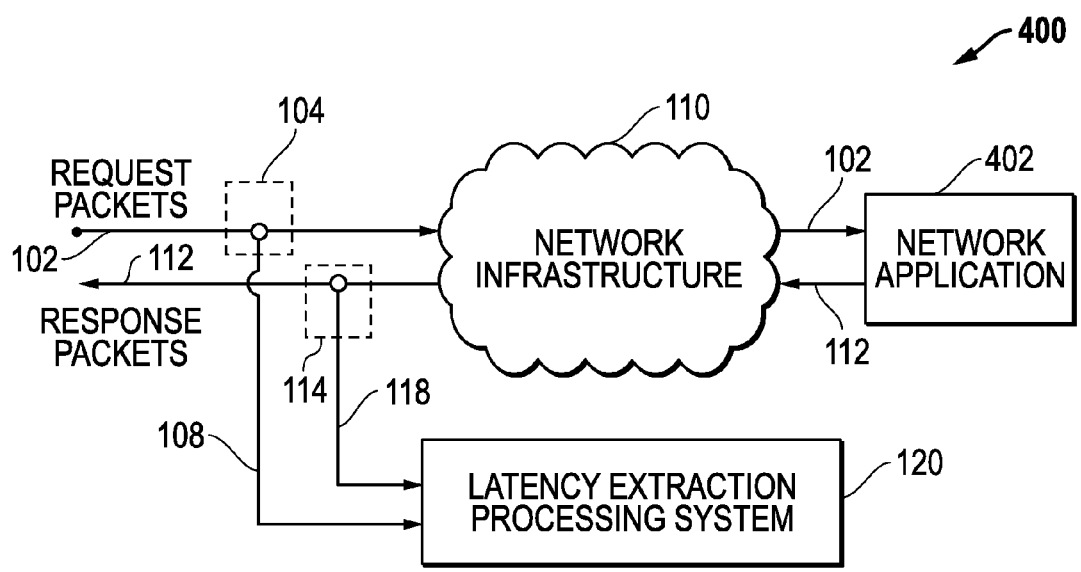
FIG. 4 is a block diagram of an example embodiment where the packet traffic being measured represents request/response packet pairs associated with a network application operating within the network packet communication system.

FIG. 4 is a block diagram of an example embodiment 400 where the packet traffic being measured represents request packets 102 and response packets 112 associated with a network application 402 operating with the network communication system. As depicted for this example embodiment 400, request packets 102, which are generated by requesting network devices, travel through network infrastructure 110 and are received by the network application 402. The network application 402 then generates response packets 112 that travel back through the network infrastructure 110 and are ultimately received by the requesting devices. The first TAP 104 extracts request packets and provides the first packet data stream 108 to the latency extraction processing system 120. The second TAP 114 extracts response packets and provides the second packet data stream 118 to the latency extraction processing system 120. Alternatively, where the request and response packets 102/112 are occurring within a common network communication path, a single network TAP or other packet extraction device/component can be used to provide copies of both the request packets 102 and the response packets 112 to the latency extraction processing system 120. As described above, timestamps can also be generated for each of the received packets. The latency extraction processing system 120 then uses the packet signatures 132, such as hash values generated based upon contents of the request packets 102 and the response packets 112, to match the response packets 112 to corresponding request packets 102. Latency associated with the request/response exchange can then be determined, as described above, using the timestamps associated with the response/request packets 102/112.

Figure 5:
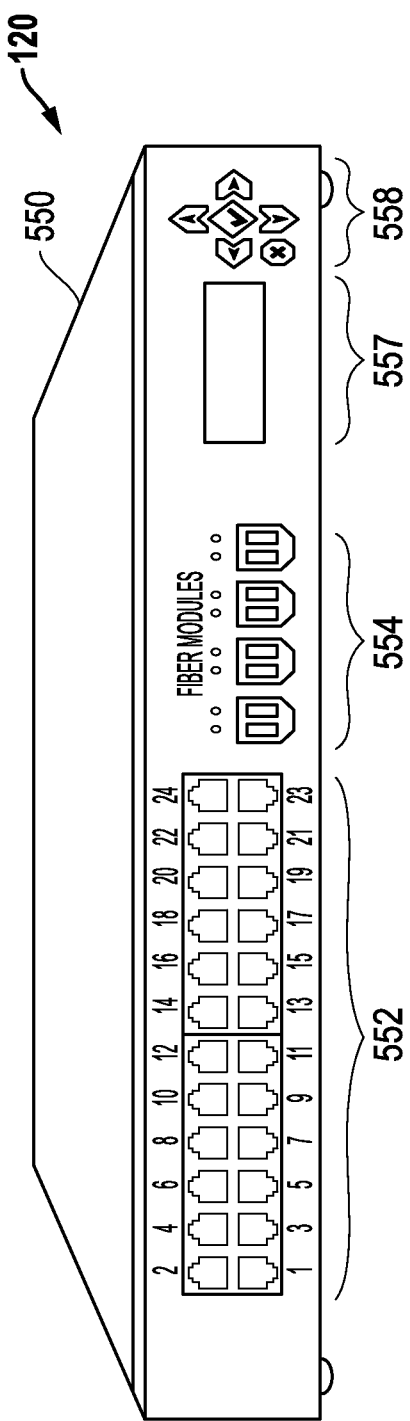
FIG. 5 is a diagram of an example embodiment for a product configuration as well as external connections for an example latency extraction processing system.

In operation for embodiment 400, therefore, the latency extraction processing system 120 measures bi-directional latency for the request/response packets 102/112. Using the packet signatures 132 (e.g., hash values), the packet flow of requests and the packet flow of responses can be paired. Once paired through matching packet signatures, their respective timestamps are used to determine request/response latency within the network communication system. The packet signatures 132 are used to pair the request packets and the response packets based upon one or more sets of fields within the packets. One or more packet classification engines 208/218 can also be used to help identify request/response packet pairs. As described above, one or more hash generators 122A/122B can also be used to generate hash values as the packet signatures based upon the selected fields within the packets, and the hash values are stored along with timestamps for received packets. Response packets are then paired with request packets based upon a look up for the hash value of each response packet with respect to stored hash values for request packets. Once this match has been found, a latency value can be determined based upon the timestamps associated with the request/response packets. For the embodiment 400, this latency represents network delays and application level delays for the request/response exchange. These latency measurements for request/response exchanges can be used for a variety of purposes to improve operations of the network communication system. For example, sizes for one or more packet buffers within the network communication system can be adjusted based upon the network/application level latency measurements to provide better quality-of-service (QoS) for applications operating within the packet network packet communication system. Other variations could also be implemented while still taking advantage of the signature-based latency extraction techniques described herein FIG. 5 is a diagram of an example embodiment for a product configuration as well as external connections for an example latency extraction processing system 120. As depicted, the latency extraction processing system 120 includes a housing 550 having external connections for a variety of connector types. For example, Ethernet port connectors 552 can be provided (e.g., Ethernet ports 1-24), and fiber optic connectors 554 can be provided for fiber optic connector modules. Further, a display screen, such a back-lit LCD (liquid crystal display) screen 557, can also be included for displaying information related to the latency extraction processing system 120. Direct navigation controls 558 can also be included, for example, for navigating management menus displayed in screen 557. Although not shown, a separate management network port can also be provided, for example, on the back of housing 550. This management network port can provide a control and management network interface for the latency extraction processing system 120. It is further noted that circuitry for the latency extraction processing system 120, including circuit boards and power supply circuitry, can be mounted within the housing 550. Other variations can also be implemented while still taking advantage of the embodiments described herein.

Figure 6A:
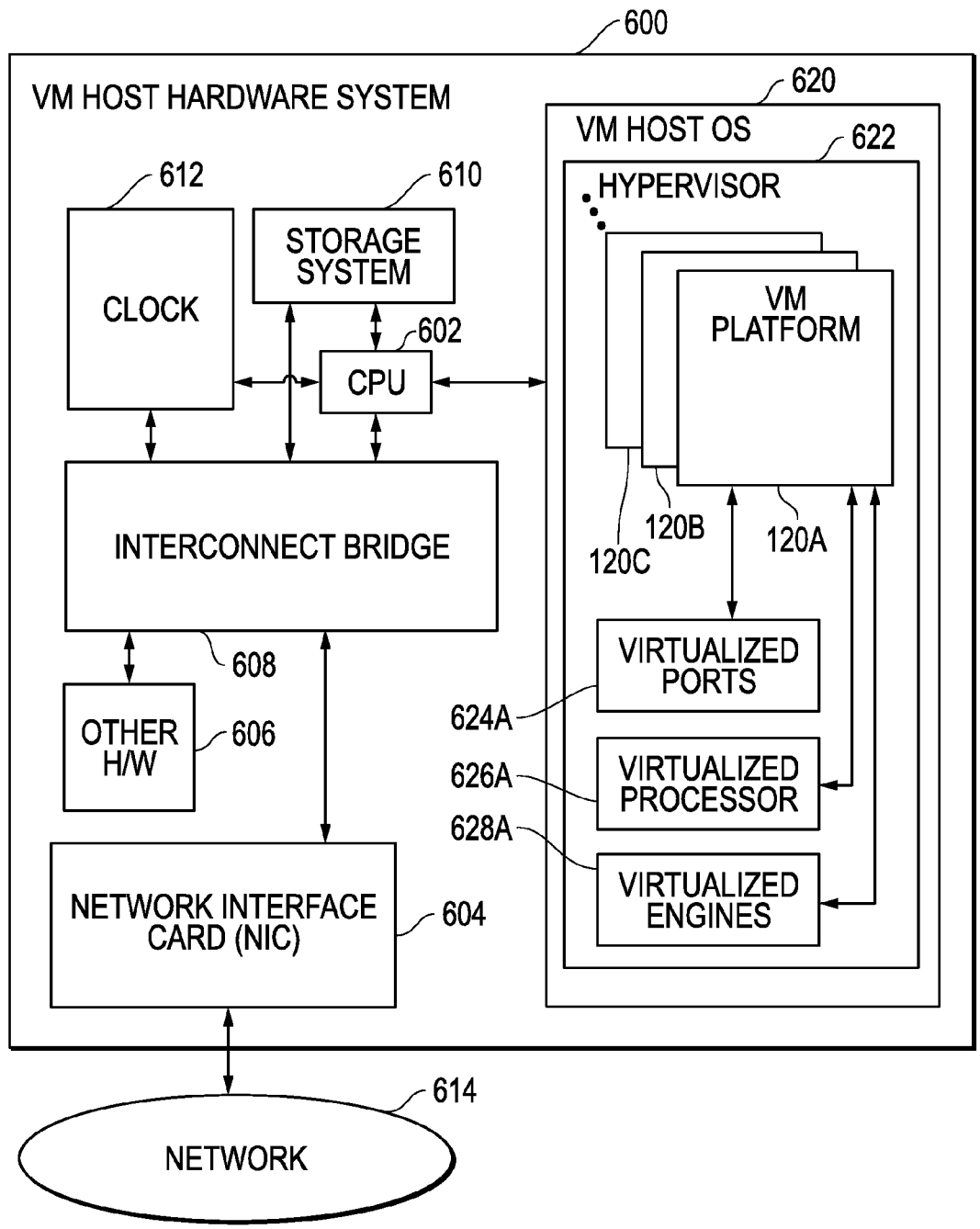
FIG. 6A is a block diagram of an example embodiment for a virtual machine (VM) host hardware system that creates a virtual environment for a virtual latency extraction processing system.
Figure 6B:
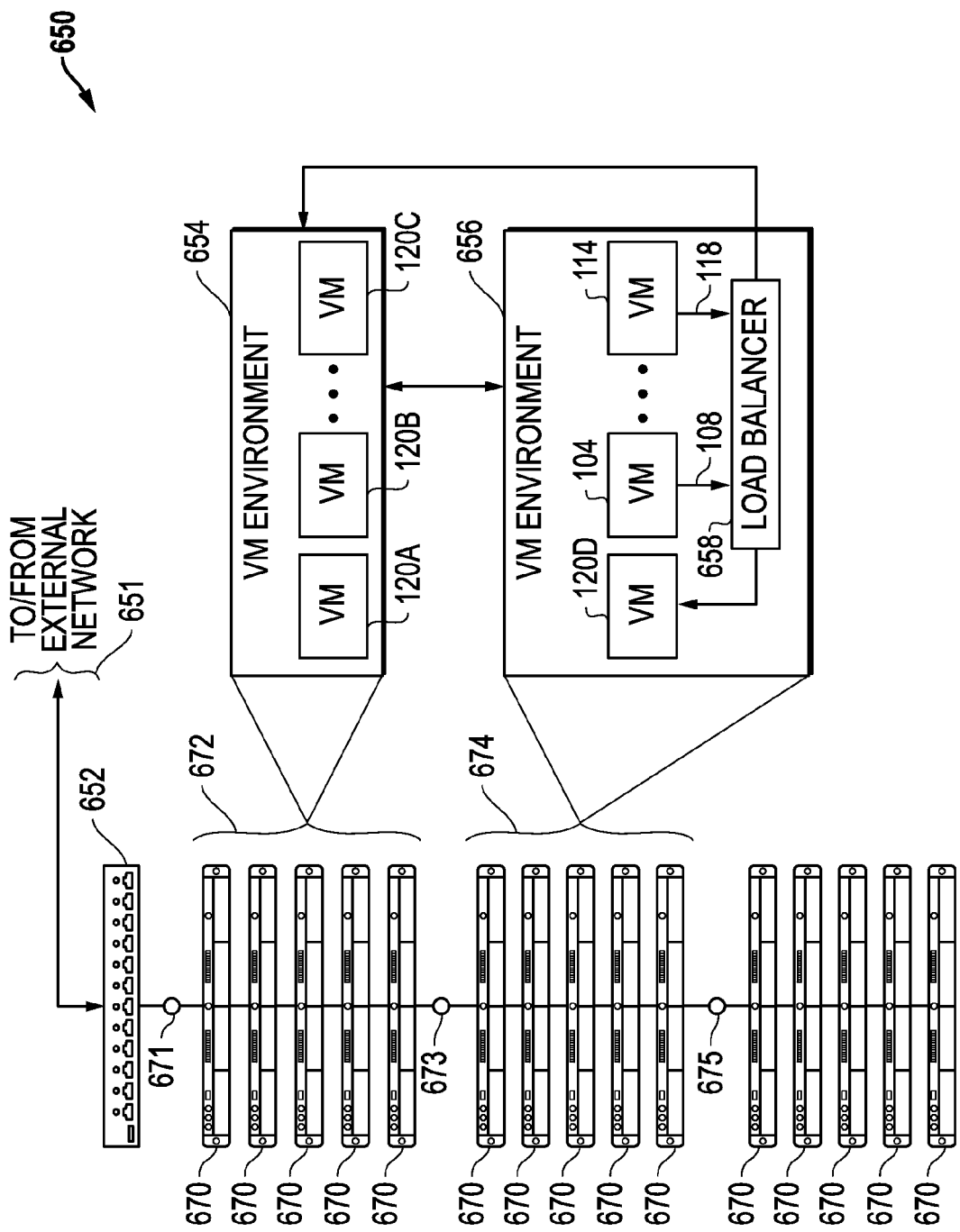
FIG. 6B is a block diagram of an example embodiment for a server system including multiple VM environments that host VM platforms implementing one or more latency extraction processing systems as well as other virtual components or devices.

As indicated above, the latency extraction processing system 120 can also be implemented as one or more virtual machine (VM) platforms within a virtual processing environment hosted by one or more processing devices. FIGS. 6A-B provide example embodiments of virtual environments. For example, one or more of the components within embodiment 100 of FIG. 1, including the latency extraction processing system 120 or components of the latency extraction processing system 120, can be virtualized such that they operate as one or more VM platforms within a virtual processing environment. Virtual resources can be made available, for example, through processors and/or processing cores associated with one or more server processing systems or platforms (e.g., server blades) used to provide software processing instances or VM platforms within a server processing system. A virtual machine (VM) platform is an emulation of a processing system that is created within software being executed on a VM host hardware system. By creating VM platforms within one or more VM host hardware systems, the processing resources of these VM host hardware systems become virtualized for use within the network packet communication system. The VM platforms can be configured to perform desired functions that emulate processing systems, such as one or more of the components of the latency extraction processing system 120.

FIG. 6A is a block diagram of an example embodiment for a virtual machine (VM) host hardware system 600 that communicates with a network 614 such as a network packet communication system. For the example embodiment depicted, the VM host hardware system 600 includes a central processing unit (CPU) 602 that runs a VM host operating system 620. An interconnect bridge 608 couples the CPU 602 to additional circuitry and devices within the VM host hardware system 600. For example, a system clock 612, a network interface card (NIC) 604, a data storage system 610 (e.g., memory) and other hardware (H/W) 606 are coupled to the CPU 602 through the interconnect bridge 608. The system clock 612 and the storage system 610 can also have a direct connections to the CPU 602. Other hardware elements and variations can also be provided.

The VM host hardware system 600 also includes a hypervisor 622 that executes on top of the VM host operating system (OS) 620. This hypervisor 622 provides a virtualization layer including one or more VM platforms that emulate processing systems, such as the latency extraction processing system 120 described above, and that provide related processing resources. As shown with respect to the VM platform that implements the latency extraction processing system 120A, each of the VM platforms 120A, 120B, 120C . . . can be configured to have one or more virtual hardware resources associated with it, such as virtualized ports 624A, a virtualized processor 626A, virtualized processing engines 628A, and/or other virtualized resources. The VM host hardware system 600 hosts each of the VM platforms 120A, 120B, 120C . . . and makes their processing resources and results available to the network 618 through the VM host operating system 620 and the hypervisor 622. As such, the hypervisor 622 provides a management and control virtualization interface layer for the VM platforms 120A-C. It is further noted that the VM host operating system 620, the hypervisor 622, and the VM platforms 120A-C as well as the related virtualized hardware resources can be implemented, for example, using computer-readable instructions stored in a non-transitory data storage medium that are accessed and executed by one or more processing devices, such as the CPU 602, to perform the functions for the VM host hardware system 600.

It is noted that the VM platforms 120A, 120B, 120C . . . can include virtual components for the components described for the latency extraction processing system 120 with respect to embodiment in FIG. 2 above. Further, the VM platforms 120A, 120B, 120C . . . can implement the functions described with respect to the embodiments described above. In such embodiments, all of the components of the latency extraction processing system 120 are include within each VM platform 120A, 120B, 120C . . . , and the packets provided to these VM platforms 120A, 120B, 120C . . . could be passed through one or more external and/or virtual load balancers to distribute the packets from one or more TAPs 104/114 that provide packet data from the network 614. Further, as indicated below, virtual TAPs could also be used. It is further noted that one or more of the individual components of the latency extraction processing system 120 can also be separately virtualized, as desired, while still taking advantage of the signature-based latency extraction techniques described herein. Still further, the virtual ports represented by 624A can be shared by all of the VM platforms 120A, 120B, 120C . . . , and a virtual load balancer within the virtualization layer provided by hypervisor 622 can be used to distribute packet data. For example, a load balancer can be used such that packets within a common flow are distributed to the same VM platform 120A, 120B, 120C . . . so that they can be processed together. Other variations can also be implemented.

FIG. 6B is a block diagram of an example embodiment for a server system 650 including multiple VM processing environments 654 and 656 that host VM platforms implementing one or more latency extraction processing systems 120A-D as well as two or more network TAPs 104/114. For the example embodiment 650, a number of processing system platforms 670, such as blade servers that each include one or more VM host hardware systems 600 of FIG. 6A, are connected to an external network communication system through connections 651 and to each other through a router or switch 652. For the example embodiment 650, the processing system platforms 670 are configured into three nominal groups as indicated by nodes 671, 673, and 675. The processing system platforms 670 within each group are managed together to provide virtual processing resources as part of the network communication system. For the example embodiment 650, one group 672 of processing system platforms 670 is used to host a VM environment 654 that includes virtual machine (VM) platforms operating to provide the latency extraction processing system 120A, 120B . . . 120C, respectively. One other group 674 of processing system platforms 670 is used to host a VM environment 656 that includes virtual machine (VM) platforms operating to provide latency extraction processing system 120D and first and second TAPs 104/114, respectively. It is noted that other groupings of processing system platforms 670 can also be used, or all of the processing system platforms 670 can be managed individually or as a single unit.

As described herein, each of the VM platforms 120A-D can receive streams of packets 108/118 from points within the network 614. Each of the VM platforms 120A-D can also receive streams of packets 108/118 from virtual points within the VM environments 654/656 as represented in embodiment 650 by virtual TAPs 104/114 and virtual packet streams 108/118 within VM environment 656. Further, there can be multiple different virtual TAPs 104/114, and a virtual load balancer 658 can be used to distribute packet data to the different VM platforms 120A-D. For example, the virtual load balancer 658 can be configured to distribute packets such that packets within a common flow are distributed to the same VM platform 120A-D so that they can be processed together. It is noted that the VM platforms 120A-C within VM environment 654 can receive packet streams from the external network as represented by connections 651, from the virtual load balancer 658, and/or directly from the virtual TAPs 104/114, as desired. Similarly, the VM platform 120D within VM environment 656 can receive packet streams from the external network as represented by connections 651, from the virtual load balancer 658, and/or directly from the virtual TAPs 104/114, as desired. The VM environments 654/656 can also be configured to communicate with each other as well as with other processing systems or virtual environments within server system 650 or the external network 614. Further, it is noted that the processing system platforms 670 can be connected to each other by a high-speed communication backbone. Other variations could also be implemented while still taking advantage of the signature-based latency extraction techniques described herein.

It is further noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to measure network packet latency, comprising:

receiving packets at a first input port associated with a first point within a network packet communication system;

receiving packets at a second input port associated with a second point within the network packet communication system; and for each received packet:
  generating a packet signature for the packet;
  comparing the packet signature to packet signatures stored in a signature table;
  if a signature match is not found, storing the packet signature within the signature table along with a timestamp associated with the received packet; and
  if a signature match is found, determining a latency value for the received packet based upon a timestamp associated with the received packet and a timestamp associated with the matching packet signature within the signature table;
wherein the received packets comprise request packets and response packets associated with the request packets, and wherein matching packet signatures are configured to pair a response packet to its associated request packet.

2. The method of claim 1, further comprising generating hash values as the packet signatures for the received packets, the hash values being based upon selected portions of the received packets.

3. The method of claim 1, further comprising storing the latency values in a latency table and using the stored latency values to determine one or more latency related parameters for the network packet communication system.

4. The method of claim 1, wherein the packets received at the input ports include timestamps.

5. The method of claim 1, further comprising generating a timestamp for each packet when the packet is received at the first input port or the second input port.

6. The method of claim 1, further comprising storing the packet signature for each received packet within an aging buffer, and after a detection time window, removing the packet signature from the aging buffer.

7. The method of claim 1, further comprising classifying each packet based upon contents of the packet to generate a packet classification, and using the packet classification to update histogram information about packets having a common packet classification.

8. The method of claim 7, wherein the histogram information comprises latency information based upon the latency values.

9. A method to measure network packet latency, comprising:
  receiving packets at a first input port associated with a first point within a network packet communication system;
  receiving packets at a second input port associated with a second point within the network packet communication system; and
  for each received packet:
    generating a packet signature for the packet;
    comparing the packet signature to packet signatures stored in a signature table;
    if a signature match is not found, storing the packet signature within the signature table along with a timestamp associated with the received packet; and
    if a signature match is found, determining a latency value for the received packet based upon a timestamp associated with the received packet and a timestamp associated with the matching packet signature within the signature table;
  wherein the method further comprises:
    storing the latency values in a latency table and using the stored latency values to determine one or more latency related parameters for the network packet communication system; and
    selecting one of the input ports as a reference port, generating sequence pointers for the latency table based upon an order in which packets are received at the reference port, and using the sequence pointers to order the latency values stored in the latency table.

10. The method of claim 9, further comprising using the ordered latency values within the latency table to determine one or more latency related parameters for the network packet communication system.

11. The method of claim 10, wherein the one or more latency related parameters comprises packet delay variation.

12. A method to measure network packet latency, comprising:
  receiving packets at a first input port associated with a first point within a network packet communication system;
  receiving packets at a second input port associated with a second point within the network packet communication system; and
  for each received packet:
    generating a packet signature for the packet;
    comparing the packet signature to packet signatures stored in a signature table;
    if a signature match is not found, storing the packet signature within the signature table along with a timestamp associated with the received packet; and
    if a signature match is found, determining a latency value for the received packet based upon a timestamp associated with the received packet and a timestamp associated with the matching packet signature within the signature table;
  wherein the method further comprises storing a port identifier associated with the received packet along with the hash value and the timestamp if a signature match is not found, and wherein a latency value is determined if a signature match is found only if a port identifier associated with the received packet does not match a port identifier stored for the matching packet within the signature table.

13. A method to measure network packet latency, comprising:
  receiving packets at a first input port associated with a first point within a network packet communication system;
  receiving packets at a second input port associated with a second point within the network packet communication system; and
  for each received packet;
    generating a packet signature for the packet;
    comparing the packet signature to packet signatures stored in a signature table;
    if a signature match is not found, storing the packet signature within the signature table along with a timestamp associated with the received packet; and
    if a signature match is found, determining a latency value for the received packet based upon a timestamp associated with the received packet and a timestamp associated with the matching packet signature within the signature table;
  wherein the method further comprises:
    storing the packet signature for each received packet within an aging buffer, and after a detection time window, removing the packet signature from the aging buffer; and comparing each removed packet signature to packet signatures within the signature table and removing any matching packet signature and related timestamp from the signature table.

14. The method of claim 13, further comprising relying upon a size of the aging buffer to determine when packet signatures are removed from the aging buffer.

15. The method of claim 13, further comprising storing the timestamp associated with each packet signature in the aging buffer, and using the timestamp associated with each packet signature to determine when each packet signature is removed from the aging buffer.

16. A system to measure latency for network packets, comprising:
   a first input port configured to receive packets associated with a first point within a network packet communication system;
   a second input port configured to receive packets associated with a second point within the network packet communication system;
   one or more packet signature generators configured to generate a packet signature for each received packet;
   a signature table configured to store packet signatures and timestamps; and
   a latency processor configured to compare the packet signature for each received packet to packet signatures stored in the signature table, to store the packet signature within the signature table along with a timestamp associated with the received packet if a signature match is not found, and to determine a latency value for the received packet based upon a timestamp associated with the received packet and a timestamp associated with the matching packet signature within the signature table if a signature match is found;
   wherein the received packets comprise request packets and response packets associated with the request packets, and wherein matching packet signatures are configured to pair a response packet to its associated request packet.

17. The system of claim 16, wherein the one or more packet signature generators comprise one or more hash generators configured to generate hash values as the packet signatures for the received packets, the hash values being based upon selected portions of the received packets.

18. The system of claim 16, wherein the latency processor is further configured to store the latency values in a latency table and to determine one or more latency related parameters for the network packet communication system based upon the stored latency values.

19. The system of claim 16, wherein the latency processor is configured to obtain timestamps from the packets received at the input ports.

20. The system of claim 16, further comprising one or more timestamp generators configured to generate a timestamp for each packet received at the first input port or the second input port.

21. The system of claim 16, further comprising an aging buffer, and wherein the latency processor is further configured to store the packet signature for each received packet within the aging buffer and to remove the packet signature from the aging buffer after a detection time window.

22. The system of claim 16, further comprising a classification engine configured to generate a packet classification for each packet based upon contents of the packet and to use the packet classification to update histogram information about packets having a common packet classification.

23. The system of claim 22, wherein the histogram information comprises latency information based upon the latency values.

24. A system to measure latency for network packets, comprising:
   a first input port configured to receive packets associated with a first point within a network packet communication system;
   a second input port configured to receive packets associated with a second point within the network packet communication system;
   one or more packet signature generators configured to generate a packet signature for each received packet;
   a signature table configured to store packet signatures and timestamps; and
   a latency processor configured to compare the packet signature for each received packet to packet signatures stored in the signature table, to store the packet signature within the signature table along with a timestamp associated with the received packet if a signature match is not found, and to determine a latency value for the received packet based upon a timestamp associated with the received packet and a timestamp associated with the matching packet signature within the signature table if a signature match is found;
   wherein the latency processor is further configured to store the latency values in a latency table and to determine one or more latency related parameters for the network packet communication system based upon the stored latency values; and
   wherein one of the input ports is a reference port, and wherein the latency processor is further configured to generate sequence pointers based upon an order in which packets are received at the reference port and to use the sequence pointers to order the latency values stored in the latency table.

25. The system of claim 24, wherein the latency processor is further configured to use the ordered latency values within the latency table to determine one or more latency related parameters for the network packet communication system.

26. The system of claim 25, wherein the one or more latency related parameters comprises packet delay variation.

27. A system to measure latency for network packets, comprising:
   a first input port configured to receive packets associated with a first point within a network packet communication system;
   a second input port configured to receive packets associated with a second point within the network packet communication system;
   one or more packet signature generators configured to generate a packet signature for each received packet;
   a signature table configured to store packet signatures and timestamps; and
   a latency processor configured to compare the packet signature for each received packet to packet signatures stored in the signature table, to store the packet signature within the signature table along with a timestamp associated with the received packet if a signature match is not found, and to determine a latency value for the received packet based upon a timestamp associated with the received packet and a timestamp associated with the matching packet signature within the signature table if a signature match is found;
   wherein the latency processor is further configured to store a port identifier associated with the received packet along with the hash value and the timestamp if a signature match is not found, and wherein the latency processor is further configured to determine a latency value if a signature match is found only if a port identifier associated with the received packet does not match a port identifier stored for the matching packet within the signature table.

28. A system to measure latency for network packets, comprising:
- a first input port configured to receive packets associated with a first point within a network packet communication system;
- a second input port configured to receive packets associated with a second point within the network packet communication system;
- one or more packet signature generators configured to generate a packet signature for each received packet;
- a signature table configured to store packet signatures and timestamps; and
- a latency processor configured to compare the packet signature for each received packet to packet signatures stored in the signature table, to store the packet signature within the signature table along with a timestamp associated with the received packet if a signature match is not found, and to determine a latency value for the received packet based upon a timestamp associated with the received packet and a timestamp associated with the matching packet signature within the signature table if a signature match is found;
- wherein the system further comprises an aging buffer;
- wherein the latency processor is further configured to store the packet signature for each received packet within the aging buffer and to remove the packet signature from the aging buffer after a detection time window; and
- wherein the latency processor is further configured to compare each removed packet signature to packet signatures within the signature table and to remove any matching packet signature and related timestamp from the signature table.

29. The system of claim 28, wherein a size of the aging buffer is configured to determine when packet signatures are removed from the aging buffer.

30. The system of claim 28, wherein the latency processor is further configured to store the timestamp associated with each packet signature in the aging buffer and to use the timestamp associated with each packet signature to determine when each packet signature is removed from the aging buffer.

* * * * *